S. C. HUMPHRIES.
SEPARABLE SQUARE.
APPLICATION FILED JAN. 14, 1910.
971,615.
Patented Oct. 4, 1910.
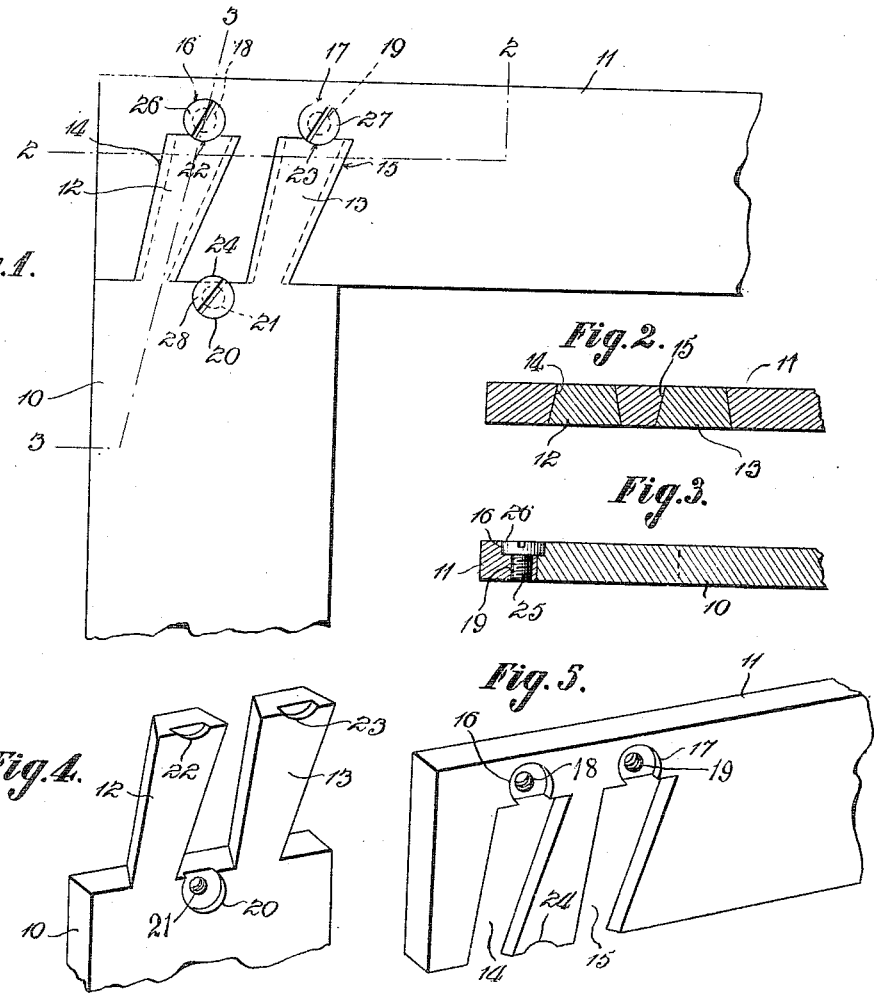

UNITED STATES PATENT OFFICE.

SMITH C. HUMPHRIES, OF DENVER, COLORADO.

SEPARABLE SQUARE.

971,615. Specification of Letters Patent. Patented Oct. 4, 1910.

Application filed January 14, 1910. Serial No. 538,084.

*To all whom it may concern:*

Be it known that I, SMITH C. HUMPHRIES, a citizen of the United States, residing at Denver, in the county of Denver, State of Colorado, have invented certain new and useful Improvements in Separable Squares; and I do hereby declare the following to be a full, clear, and exact description of the invention, such as will enable others skilled in the art to which it appertains to make and use the same.

This invention relates to separable squares, more particularly to squares employed by carpenters and other mechanics in laying out work and testing the accuracy of the work, and has for one of its objects to provide a simply constructed device in which the blades which compose the square structure are separable when not in use, so that the implement may be packed in a relatively small space in a tool chest or other receptacle.

With this and other objects in view, the invention consists in certain novel features of construction as hereinafter shown and described and then specifically pointed out in the claims; and, in the drawings illustrative of the preferred embodiment of the invention—

Figure 1 is a side elevation of a portion of a square with the improvement applied, Fig. 2 is a section on the line 2—2 of Fig. 1, Fig. 3 is a section on the line 3—3 of Fig. 1, Figs. 4 and 5 are perspective views of the contiguous portions of the blades illustrating the manner of forming the joint whereby the blade portions are united.

The improvement is designed for use more particularly in connection with what are known as carpenters' or joiners' squares, and as is well known these implements are formed of steel and comprise two blades one of which is generally two feet long and wider than the other blade which is generally fifteen inches long and of less width than the main blade.

The improved square is constructed with the main blade separate from the smaller blade and united by a detachable joint at their junctures. A portion of the larger or main blade is represented at 10, and a portion of the smaller blade at 11. The larger blade is formed with two tongues 12—13 spaced apart and with the sides diverging outwardly and with the edges beveled as shown. The small blade 11 is formed with two recesses 14—15 with beveled edges and corresponding to and adapted to receive the tongues 12—13, the tongues 12—13 being formed to closely fit within the recesses 14—15 with the opposite side faces of the tongues flush with the side faces of the blade 11, so that when the two parts 10—11 are united no obstructions are formed upon the side faces. By this arrangement when the implement is united it presents the same appearance as an ordinary square formed in one single piece.

Formed in the face of the smaller blade 11 opposite each of the recesses 14—15 are shallow recesses 16—17, and formed through the blade in the bottom of the recesses 16—17 are threaded apertures indicated at 18—19. The larger blade 10 is likewise provided with a similar shallow recess 20 located in the space between the tongues 12—13 and likewise provided with a threaded aperture leading therefrom and indicated at 21. The recesses 16—17—20 are segmental in outline, and greater than one-half of the circle, and formed in the ends of the tongues 12—13 are segmental recesses 22—23, the latter recesses corresponding to and forming continuations of the recesses 16—17, while a relatively shallow segmental recess 24 is formed in the material of the blade 11 which is located between the recesses 14—15 and corresponds to and forms a continuation of the recess 20 of the blade 10. By this arrangement when the tongues 12—13 are disposed in the recesses 14—15 as shown in Fig. 1, the shallow recesses 16—17—20 and the recesses 22—23—24 register and form complete circles partly in the tongues and partly in the blades. Each of the threaded apertures 18—19—21 are designed to receive a clamp screw one of which is shown at 25, each clamp screw having a cylindrical-shaped head represented at 26—27—28, and completely filling the larger recesses 16—17—20 and their smaller corresponding recesses 22—23—24, and thus forming an effectual locking means to connect the blades 11—12, and prevent displacement when not in use. The heads of the clamp screws it will be noted are embedded entirely within the recess so that no portion projects beyond the faces of the blades. By this means when the blades are thus united the square does not present any projections.

What is claimed is:—

1. A separable square comprising a blade having spaced tongues formed with their side edges beveled and diverging outwardly, another blade having slots to receive said tongues and with their side edges correspondingly beveled and converging, and clamping means applied to said tongues.

2. A separable square comprising a blade having spaced tongues formed with their side edges beveled and diverging outwardly, another blade having slots to receive said tongues and with their side edges correspondingly beveled and converging, and clamp screws engaging in one of said blades and having lateral heads projecting over the other blade.

3. A separable square comprising a blade having spaced tongues formed with their side edges beveled and diverging outwardly, another blade having slots to receive said tongues and with their side edges correspondingly beveled and converging, said last mentioned blade being formed with segmental recesses having threaded apertures in the bottoms thereof and communicating with the blade slots and said tongues provided with recesses registering with the blade recesses, and clamp screws operating in said threaded apertures and having enlarged heads fitting in said registering recesses.

In testimony whereof, I affix my signature, in presence of two witnesses.

SMITH C. HUMPHRIES.

Witnesses:
W. CAMPBELL GARVER,
Mrs. M. E. KINDBLADE.